United States Patent [19]

Barris et al.

[11] Patent Number: 4,986,069
[45] Date of Patent: Jan. 22, 1991

[54] ENGINE EXHAUST PARTICLE TRAP CAPTURED MASS SENSOR

[75] Inventors: Marty A. Barris, Lakeville; Wayne M. Wagner, Apple Valley, both of Minn.

[73] Assignee: Donaldson Company, Inc., Minneapolis, Minn.

[21] Appl. No.: 399,859

[22] Filed: Aug. 29, 1989

[51] Int. Cl.⁵ ............................................. F01N 3/02
[52] U.S. Cl. ......................................... 60/274; 60/286
[58] Field of Search .................................. 60/274, 286

[56] References Cited

U.S. PATENT DOCUMENTS

| | | | |
|---|---|---|---|
| 4,492,079 | 1/1985 | Takagi | 60/286 |
| 4,574,589 | 3/1986 | Hasegawa | 60/286 |
| 4,604,868 | 8/1986 | Nomoto et al. | |
| 4,608,640 | 8/1986 | Shinzawa et al. | |
| 4,610,138 | 9/1986 | Shinzawa et al. | |
| 4,630,438 | 12/1986 | Shinzawa et al. | |
| 4,730,454 | 3/1988 | Pischinger et al. | |

Primary Examiner—Douglas Hart
Attorney, Agent, or Firm—Merchant, Gould, Smith, Edell, Welter & Schmidt

[57] ABSTRACT

A sensor device having mechanisms for obtaining air mass flow rate into the engine, pressure drop across the filter, and adsolute temperature near the inlet end of the filter to calculate a factor proportional to pressure drop and inversely proportional to air mass flow rate and absolute temperature, all of which are raised to powers determined from empirical data for a particular system. When the calculated factor k exceeds a predermined value, system regeneration is initiated. The sensor mechanism and method is indpendent of engine exhaust flow, engine speed, and exhaust temperature.

2 Claims, 4 Drawing Sheets

ENGINE EXHAUST PARTICLE TRAP CAPTURED MASS SENSOR

The present invention is directed to a filtration system for exhaust gases of an engine More particularly, the filtration system includes a monolithic ceramic filter with regeneration capability wherein regeneration is initiated when a predetermined value dependent on pressure drop across the filter, air mass flow rate into the engine, and absolute temperature near the inlet end of the filter is obtained.

BACKGROUND OF THE INVENTION

Governments are increasingly regulating the exhaust emissions of vehicles. In particular, vehicles powered by diesel engines must meet more and more stringent regulations in the next several years. Cellular ceramic filters are used in high temperature engine exhaust streams as particle traps intended to satisfy certain regulations. These trap filters over time become loaded with soot. To avoid unacceptable back pressures from developing, these filters must be periodically regenerated to restore performance to that of a clean, or nearly clean, filter. The regeneration process requires control of several variables in order to achieve long trap life. A critical variable is the amount of particle mass on the trap before regeneration. So that trap life can be predictable, this particle mass just before regeneration must be approximately constant for each regeneration. Measurement of captured mass directly, however, is a difficult endeavor. The trap cannot be weighed during usage. The only typical quantities sensed are: engine air flows and temperatures, exhaust back pressure and trap differential pressure, trap temperature, and engine speed and torque.

Known regeneration systems tend to initiate when the trap differential pressure reaches a predetermined threshold value, e.g., U.S. Pat. No. 4,608,640, or a ratio of various pressures, e.g., U.S. Pat. Nos. 4,610,138 and 4,630,438. In spite of these systems which rely on pressures and differential pressures, it is well known that the trap differential pressure increases with the amount of particle loading, but at different engine speeds and loads, the pressure drop varies substantially. Furthermore, it is known that the range of exhaust temperatures affect the pressure drop to flow relationship. That is, for a given trap loading, an engine idle condition creates a pressure drop, while an engine speed several times faster than idle creates a substantially increased pressure drop. Whereas regeneration might not be triggered by the pressure drop at low engine speed, it very well may be triggered at the higher speed. Thus, depending on engine speed, the loading of the trap could vary substantially from one regeneration to the next. Such variability leads to several problems, including excessive regeneration and shorter filter life, possible overloading of the engine, etc. The present invention solves that problem and provides for an apparatus and method which regenerates at a relatively constant trapped mass weight time after time.

SUMMARY OF THE INVENTION

The present invention is directed to control apparatus for a regeneration system for a ceramic filter. The apparatus includes a first mechanism for measuring air mass flow rate into the engine, a second mechanism for measuring pressure drop across the ceramic filter, and a third mechanism for measuring absolute temperature near an inlet end of the ceramic filter. The measured parameters are processed according to a relationship which is proportional to differential pressure raised to an x power and inversely proportional to air mass flow raised to a y power and absolute temperature raised to a z power, where x, y, and z have predetermined values in a range from 0.1 to 2.0.

It was found that k is relatively constant at particular loadings regardless of engine air flow and speed and exhaust temperature. Furthermore, it was found that k increases monotonically as the trap loads. As a consequence, a threshold for a predetermined value of k is readily selected to provide an initiation point for trap regeneration.

The present invention is also directed to the method of using the indicated apparatus.

The apparatus and method are better understood by reference to the drawings briefly described hereinafter and the detailed description provided thereafter.

DETAILED DESCRIPTION OF THE PREFERRED EMBODIMENT

Figure 1:
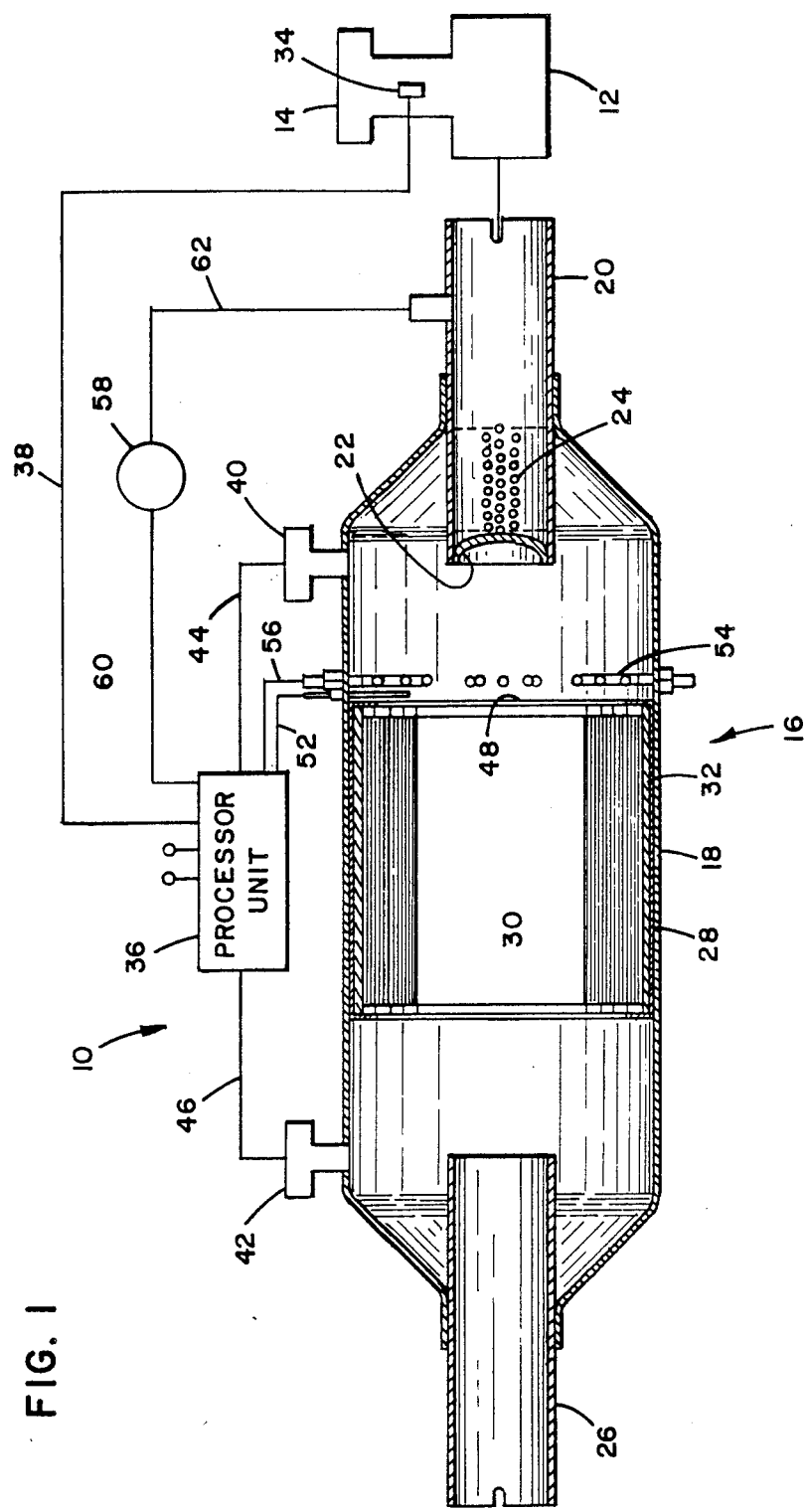
FIG. 1 is a cross-sectional view of filter apparatus together with schematically illustrated regeneration and control apparatus in accordance with the present invention.
Figure 2:
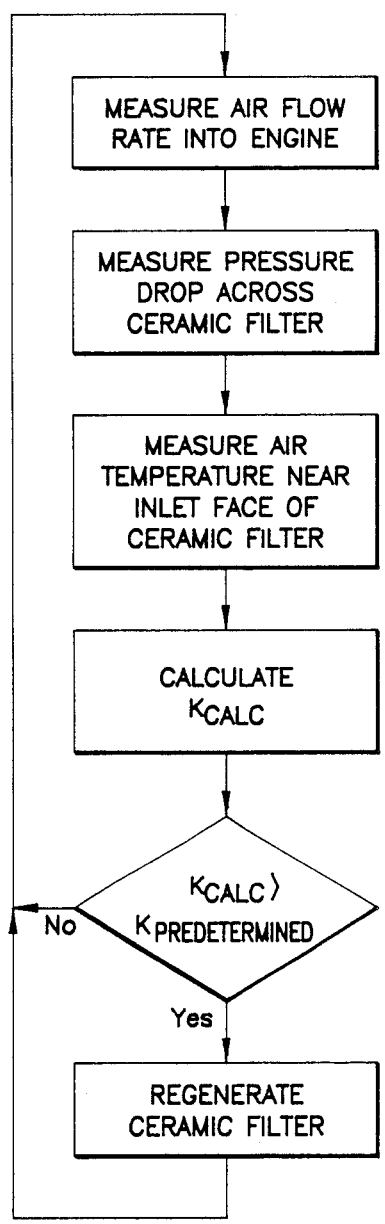
FIG. 2 is a block diagram illustrating the method of use of the apparatus shown in FIG. 1.

In reference to the drawings, wherein like reference numerals throughout the several views designate identical or corresponding parts, and, more particularly, with reference to FIG. 1 an engine and exhaust system illustrated in accordance with the present invention as designated by the numeral 10. System 10 includes engine 12 having air intake 14. Exhaust gases from engine 12 are directed to filter device 16. Device 16 includes a housing 18 which is substantially cylindrical and has narrowed ends. An inlet pipe 20 is received at one end of housing 18 and is in fluid communication with the exhaust manifold or other such structure of engine 12. Inlet pipe 20 has a closed outlet end 22 and openings 24 to allow exhaust gas to expand from inlet pipe 20 into the entry portion of the chamber formed by housing 18. An outlet pipe 26 is received at the other end of housing 18.

A monolithic ceramic filter is mounted in a can 28 tack welded or otherwise affixed to housing 18. Can 28 has in turned ends to retain filter 30 therein. A heat resistant mat 32 provides insulation and cushioning between filter element 30 and can 28. A gasket may be used between the filter element and the can at the ends of the mat. A ceramic filter 30 of the type useful with respect to the present invention is commercially available from Industrial Ceramics Department, Ceramics Products Division, Corning Glass Works, Corning, N.Y. 14830. In addition, any fuller discussion of the use of this type of ceramic filter with respect to a regenerative exhaust filtering system may be found in U.S. Pat. No. 4,851,015.

Over time, filter 30 collects an increasing mass of particulates from the exhaust of engine 12, usually in the form of a diesel engine. To maintain filtration effectiveness without creating an excessive back pressure to the engine, filter 30 must be periodically regenerated. A proper combination of differential pressure or pressure drop across filter 30, air mass flow rate into the engine, and air temperature at filter 30 results in a factor which is proportional to captured particle mass. Furthermore, the factor is independent of air flow to the engine, engine speed and exhaust temperature. In any case, the apparatus shown in FIG. 1 depicts sensors to make the indicated measurements so as to control the heating element and, in general, the regeneration of filter 30. More particularly, air mass flow rate is measured by a sensor 34 near the air intake to engine 12. The sensed measurement is communicated to processor unit 36 via line 38. Sensor 34 is a type known to those skilled in the art, such as a hot wire probe or a venturi style flow meter. Pressure sensors 40 and 42 measure pressure upstream and downstream of filter 30 so that a pressure drop can be obtained. Sensors 40 and 42 communicate necessary information to processor unit 36 via lines 44 and 46, respectively. Temperature at the front face 48 of filter 30 is measured by thermocouple 50 which communicates with processor unit 36 via line 52. At the appropriate time as discussed further hereinafter, heating element 54 is turned on via line 56. Combustion air is provided by fan 58 as controlled via line 60 with air directed upstream of filter 30 via line 62.

Figure 3:
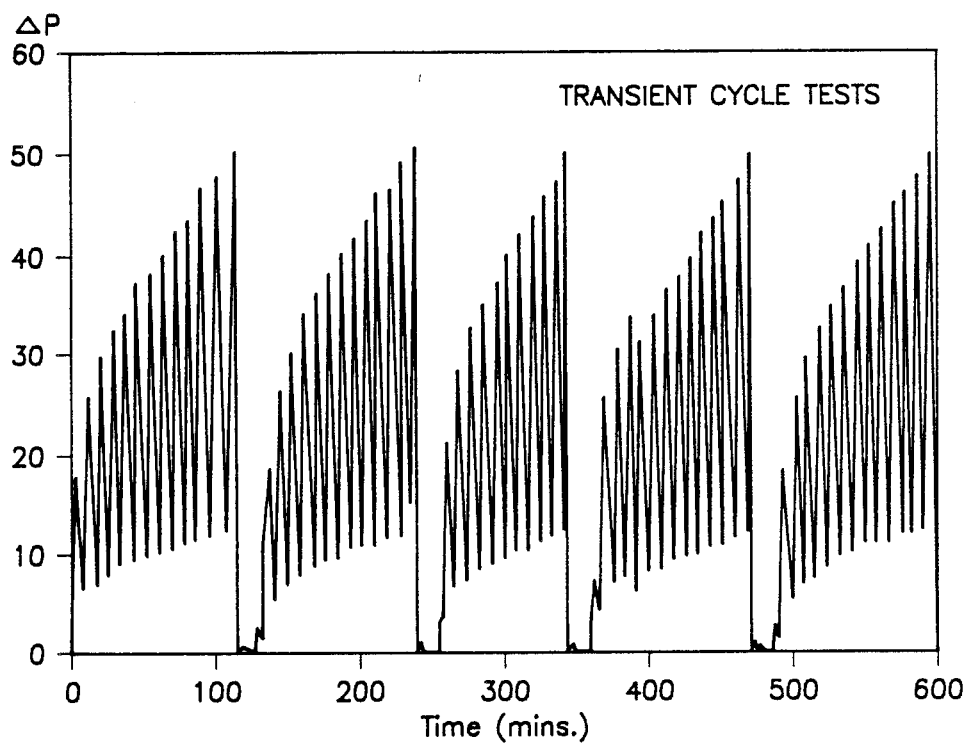
FIG. 3 is a graph of pressure drop across a filter versus time for several cycles of filter loading and for various engine speeds during each cycle.

As indicated previously, known regeneration systems determine when to initiate regeneration by sensing the pressure drop across the ceramic filter or by some other ratio or combination of various pressures and pressure drops. The problem with initiating regeneration based solely on pressure drop is illustrated with reference to FIG. 3. FIG. 3 is a graph of pressure drop across a ceramic filter versus time for several cycles of loading and regeneration. Each of the five cycles extends for approximately 120 minutes. The numerous vertical lines from one regeneration to the next in a particular cycle shows the extreme variation in pressure drop across a ceramic filter at transient engine conditions. That is, during any particular cycle the engine was run not only at slow idle, but also at a high speed and various speeds therebetween. If a pressure drop of a value between 10 to 40 inches of water were chosen as a threshold to initiate regeneration, regeneration would have started well before it actually started in the cycles shown. On the other hand, if a threshold of 50 inches of water pressure drop were chosen, the threshold would not have been reached until approximately the time regeneration was done for the cycles shown, but the pressure drop would not have been achieved unless the engine were run at high speed. If circumstances were such that the engine were never run at a high speed, conceivably the ceramic filter could severely overload before the threshold pressure drop were reached resulting in various adverse consequences for the engine and exhaust system. The present invention is directed to removing the variability of initiating regeneration characteristic of prior systems. The present invention, rather, aims to initiate regeneration consistently when a predetermined particle mass has accumulated on the filter.

A factor k can be calculated from pressure drop across the ceramic filter, air mass flow rate (or equivalent) into the engine, and air temperature near the inlet face of the ceramic filter as follows:

$$k = C \frac{\Delta P^x}{Q^y T^z}$$

where C=constant, $\Delta P$=pressure drop from first obtaining means including sensors 40 and 42, Q=air mass flow rate from said second obtaining means including sensor 34, T=absolute temperature near inlet end of ceramic filter from third obtaining means including thermocouple 50, and where x, y, and z have predetermined values in a range from 0.1 to 2.0.

Figure 4:
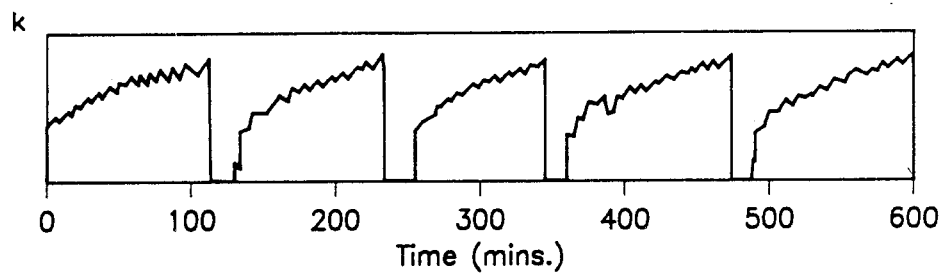
FIG. 4 is a graph of k-factor versus time for the same cycles as FIG. 3.

In appropriate tests, the factor k was found to be proportional to particle mass accumulated on a ceramic filter. The factor k, however, was found to be independent of engine speed and air flow exhaust temperature. With respect to speed, FIG. 4 shows the same engine cycles as FIG. 3. There is no wide variation of values for k in FIG. 4 as there is for pressure drop in FIG. 3 even though engine speed has the exact same variation from slow idle to high speed several times during a particular cycle.

Figure 5:
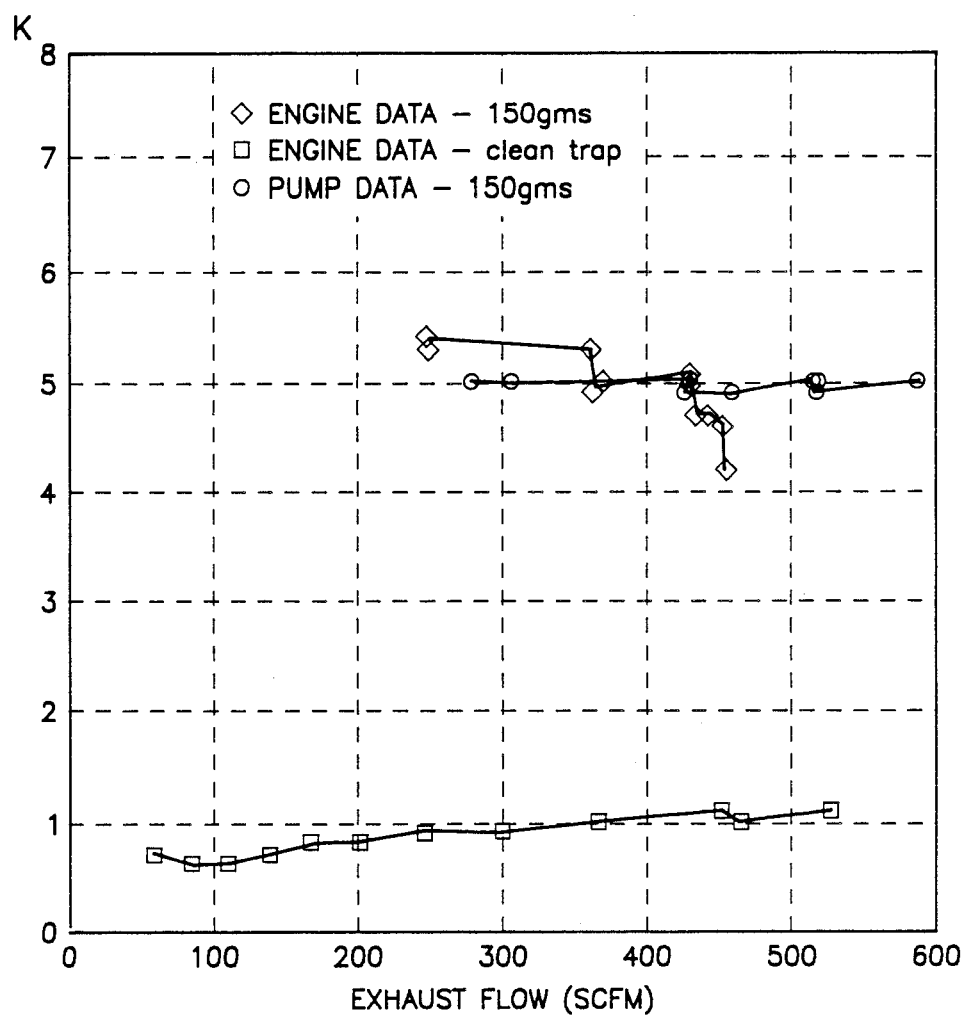
FIG. 5 is a graph of k-factor versus exhaust flow and pump flow for various filter loadings and flow temperatures.

With respect to exhaust flow from the engine, k remains relatively constant as shown in FIG. 5. For a clean trap or filter, k varies from about 0.6 to about 1.1 from a low idle exhaust flow to a high speed engine exhaust flow. There is a little more variability for a filter loaded with 150 grams of particulates. That is, k varies from about 5.4 at an exhaust flow of about 250 scfm to about 4.1 at an exhaust flow of about 460 scfm. Nevertheless, the variation of k for various exhaust flows is substantially less than the variation of pressure drop at various speeds and consequent exhaust flows as illustrated in FIG. 3.

With respect to exhaust temperature, cool air from a pump was blown through a filter loaded with 150 grams of particulates as shown in FIG. 5. The factor k was almost constant at 5.0 and was very similar to the value of k when the heated exhaust gases from the engine were directed through the filter of the same loading. Consequently, exhaust temperature does not appear to have an independent influence on the factor k.

Since the factor k increases monotonically with time and does so without great variation, various values of k relate to various weights of accumulated particulate mass accumulated on the filter. Therefore, a mass value and, consequently, a value of k can be chosen as a threshold for initiating regeneration of the filter. Different values of accumulated mass are appropriate for different sizes of ceramic filter as used with various engines and exhaust systems. An appropriate value is determinable to those skilled in the art.

The values for pressure drop, air mass flow rate, and absolute temperature near the inlet end of the ceramic filter in the equation for calculating k are raised to exponents designated x, y, and z, respectively. The exponents have predetermined values which are determinable by those skilled in the art using a least squares or other equivalent method for matching the curve of an equation to empirical data. In this case, the empirical data is obtained for a particular engine and exhaust system, usually for a particular vehicle. The exponents will have a range depending on the particular system from 0.1 to 2.0. Similarly, the proportionality constant, C, between k and the three measured values is determinable by those skilled in the art in a similar fashion.

In use, after the various exponent and proportionality constants have been determined for a particular system, the three various parameters are measured, k is calculated and compared to a predetermined value, and when appropriate, regeneration is initiated. More particularly, air mass flow rate into the engine is obtained based on signal from sensor 34. Pressure drop across the ceramic filter is obtained based on information from pressure transducers 40 and 42. Absolute temperature is obtained based on temperature information measured by thermocouple 50. The data is processed by processor unit 36 to calculate k and compared to a predetermined value of k. When the predetermined threshold value is exceeded, the processing unit provides a mechanism for initiating regeneration. That is, the heating element 54 is turned on and at appropriate times, fan 58 is turned on to provide air. As a part of regeneration, after a flame front is established in filter 30, heating element 54 is turned off. Air from fan 58 must continue to be supplied until combustion is completed. A fuller discussion of a regeneration method appropriate with apparatus disclosed herein is provided in U.S. Pat. No. 4,851,015, hereby incorporated by reference.

Thus, the present invention has been described in detail. It is understood, however, that the disclosure is representative and that equivalents are possible. Consequently, changes made, especially in matters of shape, size, and arrangement of parts or steps are within the principle of the invention to the full extent extended by the meaning of the terms in which the appended claims are expressed.

What is claimed is:

1. Control apparatus for regeneration means for a ceramic filter placed in an exhaust stream of an engine, comprising:
   first means for obtaining air mass flow rate into said engine;
   second means for obtaining pressure drop across said ceramic filter;
   third means for obtaining absolute temperature near an inlet end of said ceramic filter;
   means for regenerating said ceramic filter when an initiation signal is received; and
   means for processing said air mass flow rate, said pressure drop, and said absolute temperature from said first, second, and third obtaining means, respectively, said processing means including means for initiating said regenerating means when k is greater than a predetermined value where:

$$k = C \frac{\Delta P^x}{Q^y T^z}$$

where C = constant
   $\Delta P$ = pressure drop obtained with said first obtaining means,
   Q = air mass flow rate obtained with said second obtaining means, and
   T = absolute temperature near inlet end of ceramic filter obtained with said third obtaining means, and
   where x, y, and z have predetermined values in a range from 0.1 to 2.0.

2. A method of determining when to regenerate with a regeneration system a ceramic filter placed in an exhaust stream of an engine, comprising the steps of:
   obtaining air mass flow rate into said engine;
   obtaining pressure drop across said ceramic filter;
   obtaining absolute temperature near an inlet end of said ceramic filter;
   processing said air mass flow rate, said pressure drop, and said absolute temperature to calculate:

$$k = C \frac{\Delta P^x}{Q^y T^z}$$

where
   C = constant
   $\Delta P$ = pressure drop across said ceramic filter,
   Q = air mass flow rate into said engine, and
   T = absolute temperature near an inlet end of said ceramic filter, and
   where x, y, and z have predetermined values in a range from 0.1 to 2.0 and
   regenerating with said regeneration system said ceramic filter when k exceeds a predetermined value.

* * * * *